(12) United States Patent
Tan et al.

(10) Patent No.: US 12,091,472 B2
(45) Date of Patent: Sep. 17, 2024

(54) CHROMIUM OXIDE CATALYST FOR ETHYLENE POLYMERIZATION

(71) Applicant: SABIC GLOBAL TECHNOLOGIES B.V., Bergen op Zoom (NL)

(72) Inventors: Xiaoyu Tan, Geleen (NL); Vugar Aliyev, Geleen (NL); Orass Hamed, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 574 days.

(21) Appl. No.: 17/425,480

(22) PCT Filed: Jan. 23, 2020

(86) PCT No.: PCT/EP2020/051644
§ 371 (c)(1),
(2) Date: Jul. 23, 2021

(87) PCT Pub. No.: WO2020/152275
PCT Pub. Date: Jul. 30, 2020

(65) Prior Publication Data
US 2022/0098336 A1 Mar. 31, 2022

(30) Foreign Application Priority Data
Jan. 25, 2019 (EP) .................................. 19153648

(51) Int. Cl.
*C08F 110/02* (2006.01)
*C08F 4/69* (2006.01)

(52) U.S. Cl.
CPC ........ *C08F 110/02* (2013.01); *C08F 2410/01* (2013.01)

(58) Field of Classification Search
USPC .................................. 526/105, 141; 502/123
See application file for complete search history.

(56) References Cited

U.S. PATENT DOCUMENTS

| | | |
|---|---|---|
| 2,825,721 A | 3/1958 | Hogan et al. |
| 3,023,203 A | 2/1962 | Dye |
| 3,622,251 A | 11/1971 | Allen |
| 3,709,853 A | 1/1973 | Karapinka |
| 4,003,712 A | 1/1977 | Miller |
| 4,011,382 A | 3/1977 | Levine et al. |
| 4,302,566 A | 11/1981 | Karol et al. |
| 4,374,234 A | 2/1983 | Stricklen et al. |
| 4,543,399 A | 9/1985 | Jenkins, III et al. |
| 4,588,790 A | 5/1986 | Jenkins, III et al. |
| 4,882,400 A | 11/1989 | Dumain et al. |
| 5,352,749 A | 10/1994 | Dechellis et al. |
| 5,360,879 A * | 11/1994 | Reagen ................... C08F 10/00 502/64 |
| 5,541,270 A | 7/1996 | Chinh et al. |
| 6,319,995 B2 | 11/2001 | Glenn et al. |
| 6,989,344 B2 | 1/2006 | Cann et al. |
| 7,122,607 B2 | 10/2006 | Hagerty et al. |
| 7,300,987 B2 | 11/2007 | Hagerty et al. |
| 8,431,658 B2 | 4/2013 | Baita et al. |
| 9,593,187 B2 | 3/2017 | Gao et al. |

FOREIGN PATENT DOCUMENTS

| | | |
|---|---|---|
| JP | 2002020412 A | 1/2002 |
| WO | 2016206911 A1 | 12/2016 |
| WO | 2017125460 A1 | 7/2017 |
| WO | 2018130539 A1 | 7/2018 |

OTHER PUBLICATIONS

International Search Report for International Application No. PCT/EP2020/051644, International Filing Date Apr. 14, 2020, Date of Mailing Jan. 23, 2020, 4 pages.
PEACOCK Andrew J., "Handbook of Polyethylene", Chapter 3 Production Processes, 2000, Marcel Dekker, Inc., New York; ISBN 0824795466; p. 43-66.
Written Opinion for International Application No. PCT/EP2020/051644, International Filing Date Apr. 14, 2020, Date of Mailing Jan. 23, 2020, 7 pages.

* cited by examiner

*Primary Examiner* — Fred M Teskin
(74) *Attorney, Agent, or Firm* — CANTOR COLBURN LLP

(57) ABSTRACT

The invention relates to a solid catalyst system comprising a chromium compound, an aluminium alkoxide compound, a nitrogen containing compound and a silicon oxide support, wherein the aluminium alkoxide compound has the formula $(R^1)_2$—Al—$OR^2$ wherein $R^1$ is selected from C1-C8 alkyl groups and $OR^2$ is selected from C1-C8 alkoxyl groups and wherein the nitrogen containing compound is a cycloalkylamine compound having the general formula: $R^3$—NH2, wherein $R^3$ is selected from C3-C8 cycloalkyl groups.

13 Claims, No Drawings

CHROMIUM OXIDE CATALYST FOR ETHYLENE POLYMERIZATION

CROSS REFERENCE TO RELATED APPLICATIONS

This application is a National Stage application of PCT/EP2020/051644, filed Jan. 23, 2020, which claims the benefit of European Application No. 19153648.1, filed Jan. 25, 2019, both of which are incorporated by reference in their entirety herein.

This invention relates to a supported chromium oxide catalyst system for the production of polyethylene. The invention further relates to a process for the production of polyethylene using such catalyst system and polyethylene obtained thereby. The invention further relates to articles made from such polyethylene.

The production processes of LDPE, HDPE and LLDPE are summarised in "Handbook of Polyethylene" by Andrew Peacock (2000; Dekker; ISBN 0824795466) at pages 43-66. The catalysts can be divided in three different subclasses including Ziegler Natta catalysts, Phillips catalysts and single site catalysts. The various processes may be divided into solution polymerisation processes employing homogeneous (soluble) catalysts and processes employing supported (heterogeneous) catalysts. The latter processes include both slurry and gas phase processes.

Most of the existing chromium-based catalyst polymerization technology employs chromium oxide-based catalyst systems.

Chromium oxide-based catalyst was originally invented by Phillips in 1952 and hundreds of patents were published in relation to the system. The chromium oxide based catalyst, which is commonly referred to in the literature as "the Phillips catalyst", can be obtained by calcining a chromium compound carried on an inorganic oxide carrier in a non-reducing atmosphere. It is known to produce HDPE grades of fairly broad MWD ranging between 10-15.

Silylchromate-based catalysts generally produce desirable polyethylenes relative to those produced by chromium oxide-type catalysts. Silylchromate produced polyethylenes generally have a broader molecular weight distribution than those produced using chromium oxide-type catalysts. The broader molecular weight distribution leads to better processability of the resulting polyethylene. The main disadvantage of silylchromate-based catalyst is relatively lower productivity (gPE/g.catalyst) in comparison with chromium oxide-based catalyst. Another disadvantage is benzene traces in the final resin which limits its application if food packaging.

It is well recognized that for certain applications it is advantageous that ethylene polymers have a broad molecular weight distribution (MWD). For example, in blow molding of articles such as bottles, broad MWD polymers are desirable because they exhibit better impact strength and have superior environmental stress crack resistance (ESCR) compared to polymers with narrow molecular weight distribution. Likewise, HDPE films with broad MWD are desirable because they exhibit good tear and impact properties. The possibility of widening polymer properties profile remains a fruitful field of research aimed at producing more versatile materials.

Various attempts have been made to modify the chromium oxide based catalyst to produce polymer with higher molecular weight and broader molecular weight distribution which can be used for medium to large size blow molding containers, films, pressure pipes, fuel tanks etc.

Molecular weight and molecular weight distribution are important criteria influencing the physical and mechanical properties of polymers. Generally, the molecular weight contributes to the mechanical properties and molecular weight distribution to the processing of the polymer. Broad molecular weight distribution is essential for the easy processing of the polymer. However, there is a possibility of a loss of desired mechanical properties by broadening the molecular weight distribution. In such a situation, it is desirable to have a bimodal molecular weight distribution, wherein the composition of polymer can be altered by tailoring the proportions of high and low molecular weight components.

The molecular weight (MW) and molecular weight distribution (MWD) are important factors in determining the mechanical and rheological properties of polymers. The ratio Mw/Mn is called the polydiospersity index and is an indication of the broadness weight distribution. As polydispersity index increases, MWD broadens. If the polymer were a single macromolecule, the polydispersity would be 1.0 and the polymer would be said to be monodisperse.

For polyethylene produced with transition metal catalysts, molecular weight distribution is dictated largely by the catalyst employed. Polydispersities typically range from 2-3 for polyethylene made with single site catalysts, 4-6 for polymer produced with Ziegler-Natta catalysts and 8-20 for polyethylene made with supported chromium catalysts. It is well recognized that for certain applications it is advantageous that ethylene polymers have a broad molecular weight distribution (MWD). For example, in blow molding of articles such as bottles, broad MWD polymers are desirable because they exhibit better impact strength and have superior environmental stress crack resistance (ESCR) compared to polymers with narrow molecular weight distribution. Likewise, HDPE films with broad MWD are desirable because they exhibit good tear and impact properties. The possibility of widening polymer properties profile remains a fruitful field of research aimed at producing more versatile materials.

U.S. Pat. No. 4,374,234 discloses a process for the polymerization of ethylene by using a small amount of aluminum alkyl or a dihydrocarbylmagnesium compound in slurry olefin polymerization employing a silica supported chromium catalyst in order to reduce the induction period and increase catalyst activity while having only a modest effect on polymer properties.

U.S. Pat. No. 6,989,344 B2 is directed to the use of aluminum alkyl activators and co-catalysts to improve the performance of chromium-based catalysts. The aluminum alkyls allow for the variable control of polymer molecular weight, control of side branching while possessing desirable productivities, and may be applied to the catalyst directly or separately to the reactor. Adding the alkyl aluminum compound directly to the reactor (in-situ) eliminates induction times.

U.S. Pat. No. 9,593,187 B2 discloses a method for forming a free flowing, solid polymerization catalyst comprising mineral oil and a supported chromium catalyst.

WO2018/130539 discloses a solid catalyst system comprising a chromium compound, a titanium compound, dihexyl aluminium ethoxide and a silicon oxide support, wherein the silicon oxide support has an average particle diameter in the range between ≥20 and ≤50 μm, a pore volume in the range between ≥1.7 ml/g and ≤3 ml/g, and a surface area in the range between ≥400 m2/g and ≤800 m2/g. Although WO2018/130539 provides a method for producing a high active catalyst suitable for the production of above mentioned grades, the flowability of the catalyst obtained is not ideal in all situations.

Heterogeneous catalyst systems with poor flowability may prevent the desired smooth and continuous introduction of catalyst into the reactor. It may also stick to walls of catalyst feed vessels, feeders, and feed lines, causing buildup and possible clogging of the feed lines.

Accordingly, it is an objective of the present invention to provide a solid catalyst system having a high activity and a high flowability. It is a further objective of the present invention to provide a solid catalyst system which can be used for the production of polyethylene with a broad molecular weight distribution.

Accordingly, the present invention provides a solid catalyst system comprising a chromium compound, an aluminium alkoxide compound, a nitrogen containing compound and a silicon oxide support, wherein the aluminium alkoxide compound has the formula $(R^1)_2$—Al—$OR^2$ wherein $R^1$ is selected from C1-C8 alkyl groups and $OR^2$ is selected from C1-C8 alkoxyl groups and wherein the nitrogen containing compound is a cycloalkylamine compound having the general formula $R^3$—NH2, wherein $R^3$ is selected from C3-C8 cycloalkyl groups.

It was surprisingly found that the solid catalyst system according to the invention has a high activity and a high flowability. Further, polyethylene produced using the solid catalyst system according to the invention surprisingly has a broad molecular weight distribution.

Chromium Compound

The chromium compound may be chromium trioxide (i.e. $CrO_3$) or any compound convertible to chromium oxide. For compounds convertible to chromium oxide see U.S. Pat. Nos. 2,825,721: 3,023,203; 3,622,251 and 4,011,382.

Suitable compounds convertible to chromium oxide include for example, chromium acetyl acetone, chromium chloride, chromium nitrate, chromium acetate, chromium acetate hydroxide, chromium sulfate, ammonium chromate, ammonium dichromate, and other soluble chromium containing salts.

The amount of chromium compound added to the silicon oxide support should be sufficient to obtain between 0.01% and 10%, preferably from 0.1% to 3%, by weight of chromium, calculated as metallic chromium, based on the weight of the silicon oxide support.

Aluminium Alkoxide Compound

The aluminium alkoxide compound has the formula $(R^1)_2$—Al—$OR^2$ wherein $R^1$ is selected from C1-C8 alkyl groups and $OR^2$ is selected from C1-C8 alkoxyl groups.

Examples of suitable aluminum alkoxide compounds include diethyl aluminium ethoxide, dihexyl aluminium ethoxide, dioctyl aluminium ethoxide and dihexyl aluminium propoxide.

Most preferably, the aluminium alkoxide compound is diethyl aluminium ethoxide.

Preferably, the molar ratio of Al to Cr in the solid catalyst system is 1.0 to 10.0, for example 3.0 to 8.0. This was found to lead to a broad molecular weight distribution of the polyethylene produced.

Nitrogen Containing Compound

The nitrogen containing compound is a cycloalkylamine having the general formula R3-NH2, wherein R3 is selected from C3-C8 cycloalkyl groups.

More preferably, the nitrogen containing compound is selected from the group consisting of cyclopropylamine, cyclobutylamine, cyclopentylamine, cyclohexylamine, cycloheptylamine and cyclooctylamine, more preferably selected from cyclohexylamine and cyclooctylamine, most preferably is cyclohexylamine.

Preferably, the molar ratio of Cr to N in the solid catalyst system is 0.5 to 5.0, for example 1.1 to 4.0 or 1.5 to 3.0. A particularly high catalyst activity is achieved when the molar ratio of Cr to N is higher than 1.0.

Preferably, the molar ratio of Al to N in the solid catalyst system is 3.0 to 20, for example 7.0 to 18 or 8.0 to 15. A particularly high catalyst activity is achieved when the molar ratio of Al to N is higher than 6.0.

In very preferred embodiments, the molar ratio of Cr to N in the solid catalyst system is higher than 1.0 and the molar ratio of Al to N is 6.0. This leads to a particularly high catalyst activity.

In particularly preferred embodiments, the molar ratio of Cr to N in the solid catalyst system is 1.5 to 3.0 and the molar ratio of Al to N is 8.0 to 15. This leads to a particularly high catalyst activity.

Silicon Oxide Support

A silica support that is suitable for use in the present invention has a relatively high surface area and is amorphous.

Preferably, the silicon oxide support has an average particle diameter of 20 to 50 µm, more preferably 30 to 40 µm. The average particle diameter is determined via ASTM D-1921 12.

Preferably, the silicon oxide support has a pore volume of 1.7 to 3.0 m$^3$/kg, more preferably 1.7 to 1.9 m$^3$/kg. The pore volume is determined by ASTM D4284-12 (2012) "Standard Test Method for Determining Pore Volume Distribution of Catalysts and Catalyst Carriers by Mercury Intrusion Porosimetry".

Preferably, the silicon oxide support has a surface area of 400 to 800 m$^2$/g, more preferably 500 to 600 m$^2$/g. The surface area of the support is determined by the BET nitrogen adsorption method. Test Method: ASTM D 1993-03 (2013) Standard Test Method for Precipitated Silica-Surface Area by Multipoint BET Nitrogen Adsorption. See also references "Adsorption, Surface Area and Porosity" by S. J. Gregg and K. S. W. Sing, Academic Press, London (1982) and "Introduction to Powder Surface Area" by S. Lowell, J. Wiley & Sons, New York, NY, (1979).

Preferably, the silicon oxide support has a pore radius of 100 to 200 Angstrom. The pore radius is determined by ASTM D4284-12 (2012) "Standard Test Method for Determining Pore Volume Distribution of Catalysts and Catalyst Carriers by Mercury Intrusion Porosimetry".

Non-Chromium Metal Compound

Preferably, the catalyst system further comprises a non-chromium metal compound, i.e. a metal compound which contains a metal which is not chromium. This non-chromium metal compound acts as a modifier and is used for the synthesis of the solid catalyst component according to the invention.

Preferably, the non-chromium compound is a metal halide transition metal compound and is selected from compounds represented by formulas $Tm(OR^4)_n X_{4-n}$ and $Tm(R^5)_n X_{4-n}$, wherein Tm represents a transition metal of Group IVB, VB, or VIB, $R^4$ and $R^5$ is independently selected from $C_1$-$C_{20}$ alkyl groups, $C_1$-$C_{20}$ aryl groups and $C_1$-$C_{20}$ cycloalkyl groups, X represents a halogen atom, preferably chlorine and n represents a number satisfying $0 \leq n \leq 4$, preferably $1 \leq n \leq 4$.

Preferably, the metal in the non-chromium metal compound, Tm, is selected from titanium, vanadium, hafnium and zirconium, and is most preferably titanium.

Examples of suitable titanium compounds include titanium alkoxy compounds for example tetraethoxy titanium, tetramethoxy titanium, tetrabutoxy titanium, tetrapropoxy titanium (in particular tetraisopropoxy titanium), tetraisobutoxy titanium, tetrapentoxy titanium, triethoxychloro titanium, diethoxydichloro titanium, trichloethoxy titanium, methoxy titanium trichloride, dimethoxy titanium dichloride, ethoxy titanium trichloride, diethoxy titanium dichloride, propoxy titanium trichloride, dipropoxy titanium dichloride, butoxy titanium trichloride, butoxy titanium dichloride and titanium tetrachloride.

Other suitable non-chromium metal compounds include for example vanadium trichloride, vanadium tetrachloride, vanadium oxytrichloride and zirconium tetrachloride.

Preferably, the amount of the metal in the non-chromium metal compound in the solid catalyst system, in particular the amount of Ti in the solid catalyst system, is between 0.1 and 10.0% by weight, preferably in the range between 0.1 and 6.0% by weight.

Preferably, the weight ratio between the metal in the non-chromium metal compound in the solid catalyst system and Cr, in particular Ti:Cr, is 2 to 4.

Process for Preparation of Catalyst System

The invention further relates to a process for the preparation of the catalyst according to the invention, comprising
i) providing the chromium compound and the optional non-chromium metal compound on the silica support and
    ii-1) treating the product obtained by step i) with the aluminium alkoxide compound and
    iii-1) treating the product obtained by step ii-1) with the nitrogen-containing compound or
    ii-2) treating the product obtained by step i) with the nitrogen-containing compound and
    iii-2) treating the product obtained by step ii-2) with the aluminium alkoxide compound.

Activation

The catalyst system may require activation prior to use. Activation by calcination can be accomplished by heating the solid catalyst system in steam, dry air or another oxygen containing gas at temperatures up to the sintering temperature of the support. Activation temperatures are typically in the range of 300° C. to 950° C., preferably from 500° C. to 900° C. and activation times are typically from about 10 min. to as about 72 hrs. The solid catalyst system may optionally be reduced after activation using for example, carbon monoxide or a mixture of carbon monoxide and nitrogen.

Process for Producing Polyethylene

The present invention further relates to a process for the production of polyethylene by polymerisation of ethylene and an optional comonomer in the presence of the catalyst according to the invention.

Preferably, the polyethylene is a high density polyethylene having a density of 945 to 970 kg/m³, preferably 950 to 965 kg/m³.

The polyethylene may be an ethylene homopolymer or an ethylene copolymer of ethylene and a comonomer selected from the group consisting of propylene, 1-butene, 1-pentene, 4-methyl-1-pentene, 1-hexene and 1-octene, preferably 1-hexene.

In the process according to the invention, the solid catalyst system of the present invention is added to a polymerization zone using a dry catalyst feeder. The operation is often carried out under a nitrogen atmosphere and the dry catalyst is transferred to the reactor under positive nitrogen pressure. For methods of feeding a dry catalyst to a polymerization reactor is described for example, in U.S. Pat. Nos. 6,319,995 and 8,431,658.

The process may be a slurry phase or a gas phase polymerization process, preferably a gas phase polymerization process.

The gas phase polymerization process may use any gas phase reactor for gas phase polymerizations and may e.g. be vertically, horizontally mechanically agitated reactor or a fluidized bed reactor.

In general, a fluidized bed gas phase polymerization reactor employs a "bed" of polymer and catalyst which is fluidized by a flow of monomer, comonomer and other optional components which are at least partially gaseous. Heat is generated by the enthalpy of polymerization of the monomers flowing through the bed. Unreacted monomers and other optional gaseous components exit the fluidized bed and are contacted with a cooling system to remove this heat. The cooled gas stream, including monomer, comonomer and optional for example condensable liquids, is then re-circulated through the polymerization zone. Simultaneously, polymer product is withdrawn from the reactor. The reactor temperature in a gas phase process may range between for example 30° C. and 130° C. A description of a gas phase process is disclosed in for example U.S. Pat. Nos. 4,543,399 and 4,588,790.

Suitable fluidized bed reactors include for example a bubbling fluidized bed reactor, a circulating fluidized bed reactor, an annular fluidized bed reactor, a multi-zone fluidized bed reactor and a flash reactor. With 'fluidized bed' is meant that an amount of solid particles (in this case preferably the solid catalyst and/or the solid catalyst to which the monomer is attached) in a solid/fluid mixture acts as a fluid. This can be achieved by placing the amount of solid particles under appropriate conditions, for instance by the introduction of fluid through the solid particles at a high enough velocity to suspend the solid particles and causing them to behave as a fluid. An example of a process using a fluidized bed for producing polyolefins is disclosed in U.S. Pat. No. 4,882,400. Other examples of processes using a fluidized bed for producing polyolefins are described in, for example, U.S. Pat. Nos. 3,709,853; 4,003,712; 4,011,382; 4,302,566; 4,543,399; 4,882,400; 5,352,749; 5,541,270; 7,122,607, and 7,300,987.

The present invention further relates to the polyethylene obtainable by or obtained by the process according to the invention.

The present invention further relates to a composition comprising the high density polyethylene obtainable by or obtained by the process according to the invention. The composition may further comprise additives for example lubricants, fillers, stabilisers, antioxidants, compatibilizers and pigments. The additives used to stabilize the polymers may be, for example, additive packages including hindered phenols, phosphites, UV stabilisers, antistatics and stearates.

The invention also relates to a molded article comprising the high density polyethylene or the composition comprising the high density polyethylene according to the present invention. The molded article may preferably be a blow molded article or an extrusion molded article. The molded article may preferably be selected from films, pipes, bottles, IBC containers, tight head and open head drums and fuel tanks.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

CATALYST PREPARATION

EXAMPLE 1 (COMPARATIVE)

Catalyst A

To a three-necked round bottom flask equipped with a condenser and a mechanical stirrer, 200 g of dried silica support (surface area 550 m$^2$/g, pore volume 1.85 ml/g and average particle diameter 33 μm) was placed at 200° C. 4.7 g of chromium acetate hydroxide was then added to the silica and then slurried in 250 cm$^3$ of methanol (100%), which was stirred at 80° C. for 30 minutes. Subsequently, drying of the methanol solvent took place at 95° C. with nitrogen purge. The dried chromium on silica powder was cooled down to room temperature then slurried with 250 cm$^3$ of iso-pentane, followed by the addition of 41 cm$^3$ of tetraethoxy titanium Ti(OC$_2$H$_5$)$_4$ (100%). The contents were mixed at 65° C. for another 10 minutes and then the solvent was dried at 95° C. with nitrogen purge.

For chromium catalyst activation the dried catalyst powder was placed in a calciner and the following sequence was followed:

Ramp from ambient to 400° C. in under N2 flow then hold for 20 minutes
At 400° C. switch from N2 to Air flow
Ramp from 400° C. to 800° C. under dry Air
Hold at 800° C. for 4 hours under Dry Air
Cool to room temperature then switch to N2 purge.

EXAMPLE 2 (COMPARATIVE)

Catalyst B 120 gram of catalyst A was placed in a 1000 cm$^3$ flask. 800 cm$^3$ of isopentane was added to slurry the activated catalyst, then diethylaluminum ethoxide (DEALE) was added to the flask and the resultant mixture was agitated for 5 minutes at 45° C. The slurry was dried under vacuum or using a nitrogen purge at a temperature of 60° C. The modified catalyst was stored under nitrogen until use. The mole ratio of Cr/Al was 1:6.

EXAMPLE 3 (INVENTIVE)

Catalyst C 120 gram of catalyst A was placed in a 1000 cm$^3$ flask. 800 cm$^3$ of isopentane was added to slurry the activated catalyst, then cyclohexylamine (CHA) was added to the flask and the resultant mixture agitated for 5 minutes at 45° C. then followed by the addition of diethylaluminum ethoxide (DEALE). The slurry was dried under vacuum or using a nitrogen purge at a temperature of 60° C. The modified catalyst was stored under nitrogen until use. The mole ratio of Cr/Al/N was 1:6:1.

EXAMPLE 4 (INVENTIVE)

Catalyst D 120 gram of catalyst A was placed in a 1000 cm$^3$ flask. 800 cm$^3$ of isopentane was added to slurry the activated catalyst, then diethylaluminum ethoxide (DEALE) was added to the flask and the resultant mixture agitated for 5 minutes at 45° C. then followed by the addition of cyclohexylamine. The slurry was dried under vacuum or using a nitrogen purge at a temperature of 60° C. The modified catalyst was stored under nitrogen until use. The mole ratio of Cr/Al/N was 1:6:1.

EXAMPLE 5 (INVENTIVE)

Catalyst E 120 gram of catalyst A was placed in a 1000 cm$^3$ flask. 800 cm$^3$ of isopentane was added to slurry the activated catalyst, then diethylaluminum ethoxide (DEALE) was added to the flask and the resultant mixture agitated for 5 minutes at 45° C. then followed by the addition of cyclohexylamine. The slurry was dried under vacuum or using a nitrogen purge at a temperature of 60° C. The modified catalyst was stored under nitrogen until use. The mole ratio of Cr/Al/N was 1:6:0.5.

Polymerization

The polymerization reaction was carried out in a two liters stirred autoclave reactor in deoxygenated isopentane using catalysts A-E. The polymerisation reaction was conducted at 100° C. and 20 bars (290 psi) of total pressure. Ethylene polymerisation was carried out for 1 hour, with ethylene supplied on demand to maintain the total reactor pressure at 20 bar. Upon completion of the polymerisation, the reactor was vented and cooled to ambient temperature to recover the polymer.

Polymer molecular weight and its distribution (MWD) were determined by Polymer Labs 220 gel permeation chromatograph. The chromatograms were run at 150° C. using 1,2,4-trichlorobenzene as the solvent with a flow rate of 0.9 ml/min. A refractive index detector is used to collect the signal for molecular weights. The software used is Cirrus from PolyLab for molecular weights from GPC. The calibration of the HT-GPC uses a Hamielec type calibration with broad standard and fresh calibration with each sample set.

The results are shown in Table 1 and Table 2.

TABLE 1

| Example | Catalyst | Catalyst activity gPE/gcat · r | Density (g/cm³) | Catalyst Flowability |
| --- | --- | --- | --- | --- |
| 1 | A | 1240 | 0.39 | Excellent |
| 2 | B | 970 | 0.38 | Poor |
| 3 | C | 505 | 0.38 | Excellent |
| 4 | D | 580 | 0.38 | Excellent |
| 5 | E | 1010 | 0.37 | Good |

TABLE 2

| Example | Catalyst | Mw | Mn | MWD | Mz | Mz + 1 |
| --- | --- | --- | --- | --- | --- | --- |
| 1 | A | 165090 | 11766 | 14.0 | 1229396 | 3658589 |
| 2 | B | 234678 | 12909 | 17.2 | 1655289 | 3368837 |
| 3 | C | 348746 | 16497 | 21.1 | 2207647 | 4562116 |
| 4 | D | 339284 | 15543 | 21.8 | 2326247 | 4954030 |
| 5 | E | 294786 | 15343 | 20.1 | 2169620 | 4518563 |

It can be understood by the comparison of catalysts A and B that the addition of DEALE leads to a decrease in the catalyst flowability although the MWD is increased.

The comparison of catalysts C-E with B shows that the addition of the amine compound leads to an increase in the catalyst flowability and an increase in the MWD.

The comparison of catalyst C and catalyst D shows that the the order of the addition of the aluminium alkoxide compound and the amine compound does not have a large influence in the catalyst properties.

Catalyst E has a substantially higher catalyst activity than catalyst D and thus the best balance of the catalyst activity, catalyst flowability and MWD. The comparison of catalyst D and catalyst E shows that the higher amount of Cr and Al with respect to N.

The invention claimed is:

1. A solid catalyst system comprising a chromium compound, an aluminium alkoxide compound, a nitrogen containing compound and a silicon oxide support, 
    wherein the aluminium alkoxide compound has the formula

wherein $R^1$ is selected from C1-C8 alkyl groups and $OR^2$ is selected from C1-C8 alkoxyl groups and
    wherein the nitrogen containing compound is a cycloalkylamine compound having the general formula: $R^3$—NH2, wherein $R^3$ is selected from C3-C8 cycloalkyl groups.

2. The solid catalyst system according to claim 1, wherein the chromium compound is selected from chromium trioxide, chromium acetyl acetone, chromium chloride, chromium nitrate, chromium acetate, chromium acetate hydroxide, chromium sulfate, ammonium chromate and ammonium dichromate.

3. The solid catalyst system according to claim 1, wherein the molar ratio of Al to Cr in the solid catalyst system is 1.0 to 10.0.

4. The solid catalyst system according to claim 1, wherein the aluminium alkoxide compound is selected from the group consisting of diethyl aluminium ethoxide, dihexyl aluminium ethoxide, dioctyl aluminium ethoxide and dihexyl aluminium propoxide.

5. The solid catalyst system according to claim 1, wherein the nitrogen containing compound is selected from the group consisting of cyclopropylamine, cyclobutylamine, cyclopentylamine, cyclohexylamine, cycloheptylamine and cyclooctylamine.

6. The solid catalyst system according to claim 1, wherein the molar ratio of Cr to N in the solid catalyst system is 0.5 to 5.0.

7. The solid catalyst system according to claim 1, wherein the molar ratio of Al to N in the solid catalyst system is 3.0 to 20.

8. The solid catalyst system according to claim 1, wherein the silicon oxide support has an average particle diameter of 20 to 50 μm, a pore volume of 1.7 to 3.0 m³/kg and/or a surface area of 400 to 800 m²/g.

9. The solid catalyst system according to claim 1, further comprising a non-chromium metal compound.

10. The solid catalyst system according to claim 9, wherein the non-chromium metal compound is a titanium compound selected from the group consisting of tetraethoxy titanium, tetramethoxy titanium, tetrabutoxy titanium, tetrapropoxy titanium, tetraisobutoxy titanium, tetrapentoxy titanium, triethoxychloro titanium, diethoxydichloro titanium, trichloethoxy titanium, methoxy titanium trichloride, dimethoxy titanium dichloride, ethoxy titanium trichloride, diethoxy titanium dichloride, propoxy titanium trichloride, dipropoxy titanium dichloride, butoxy titanium trichloride, butoxy titanium dichloride and titanium tetrachloride.

11. The solid catalyst system according to claim 10, wherein the weight ratio of Ti:Cr is 2 to 4.

12. A process for the preparation of the solid catalyst system according to claim 1, comprising
    i) providing the chromium compound and an optional non-chromium compound on the silica support; and
    ii-1) treating the product obtained by step i) with the aluminium alkoxide compound and
        iii-1) treating the product obtained by step ii-1) with the nitrogen-containing compound, or
    ii-2) treating the product obtained by step i) with the nitrogen-containing compound and
        iii-2) treating the product obtained by step ii-2) with the aluminium alkoxide compound.

13. A process for the production of polyethylene by polymerisation of ethylene and an optional comonomer in the presence of the solid catalyst system according to claim 1.

* * * * *